Jan. 23, 1940.　　　G. M. LOCK ET AL　　　2,187,833
BEAN CUTTER
Filed Sept. 22, 1936　　　2 Sheets-Sheet 1

INVENTORS
G. M. Lock and
A. O. Rasmussen
BY
ATTORNEY

Jan. 23, 1940.  G. M. LOCK ET AL  2,187,833
BEAN CUTTER
Filed Sept. 22, 1936   2 Sheets-Sheet 2
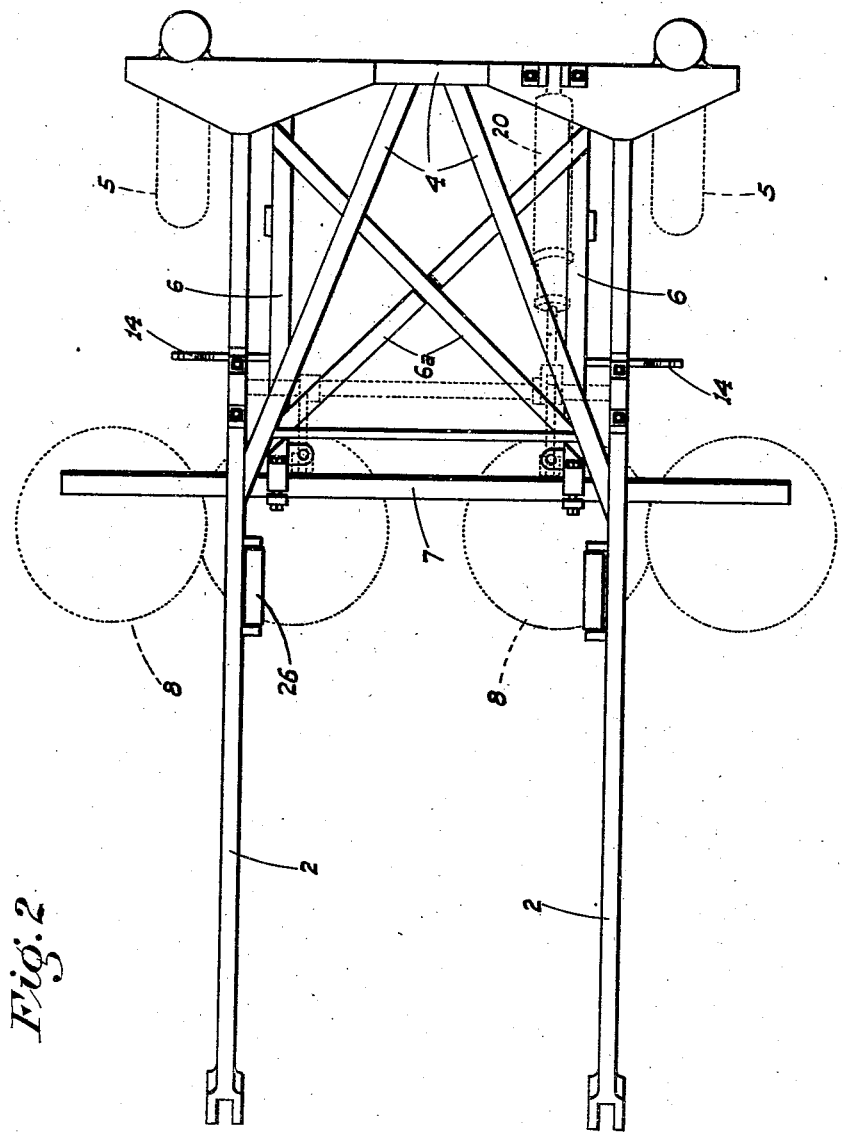
Fig. 2
INVENTORS
G. M. Lock and
A. O. Rasmussen
BY 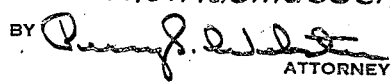
ATTORNEY Patented Jan. 23, 1940

2,187,833

UNITED STATES PATENT OFFICE 2,187,833

BEAN CUTTER

George M. Lock and Arthur O. Rasmussen, Modesto, Calif.

Application September 22, 1936, Serial No. 101,950

3 Claims. (Cl. 55—62)

This invention relates to the art of cutting growing bean vines preparatory to the harvesting of the beans.

When the beans have grown and ripened to substantial maturity ready for harvesting, the several vines in adjacent rows have more or less intermingled and it presents quite a problem to properly divide them, cut the vines from the roots and to windrow them ready for curing and harvesting in a rapid and economical manner and without materially damaging the full bean pods with consequent premature shelling out of the beans.

Long blade cutters pushed along the surface of the ground have been used but these very rapidly dull. Furthermore, in travelling over uneven ground, the necessary length of these blade cutters often causes them to lift the carrier so that the blades miss the vines and then on dipping down the other side of a high spot the blades will dig into the ground and bend or render it difficult for the cutter as a whole to function efficiently.

Concave disc cutters, similar to disc harrow discs, have also been tried set at an angle to the ground and adapted to be rotated by the pressure of the soil against the discs with the forward push of the implement. However, due to the concavity of the discs, there is not presented a sufficient cutting edge to effectually cut the vines unless the discs are set well into the ground, in which event they do not function effectively to cut the vines at the crown of the roots, but tend rather to plow up the roots, dirt and all, which is impractical.

Flat discs lying in the horizontal plane of the earth's surface have been tried also, but in order to rotate these, they must be power driven, which materially increases the difficulty and cost of operation of the implement and the wear on the discs is so excessive as to render this method wholly impracticable.

The object of our present invention has been therefore to produce a bean cutter in which a constantly maintained keen and sharp cutting edge is presented immediately and continuously against the vines at the crown of the roots and which edge is self sharpening.

A further object is to produce such a cutting edge of a length sufficient to effectively contact and cut the vines but which will not lift from or dig into the soil as the implement travels over uneven ground.

These objects we accomplish by the use of flat discs set at such an angle to the ground that an effective length of cutting edge will be presented against the vines and the friction of the ground against the discs with the forward movement of the implement will cause rotation of the discs and effectively sharpen the direct cutting edges of the same but without excessive wear.

In the drawings which form a part of this application:

Fig. 2 is a top plan view of the implement frame alone, showing the discs and supporting means in dotted lines.

Fig. 3 is a rear elevation of a pair of cutting discs showing the discs in section.

Figure 1:
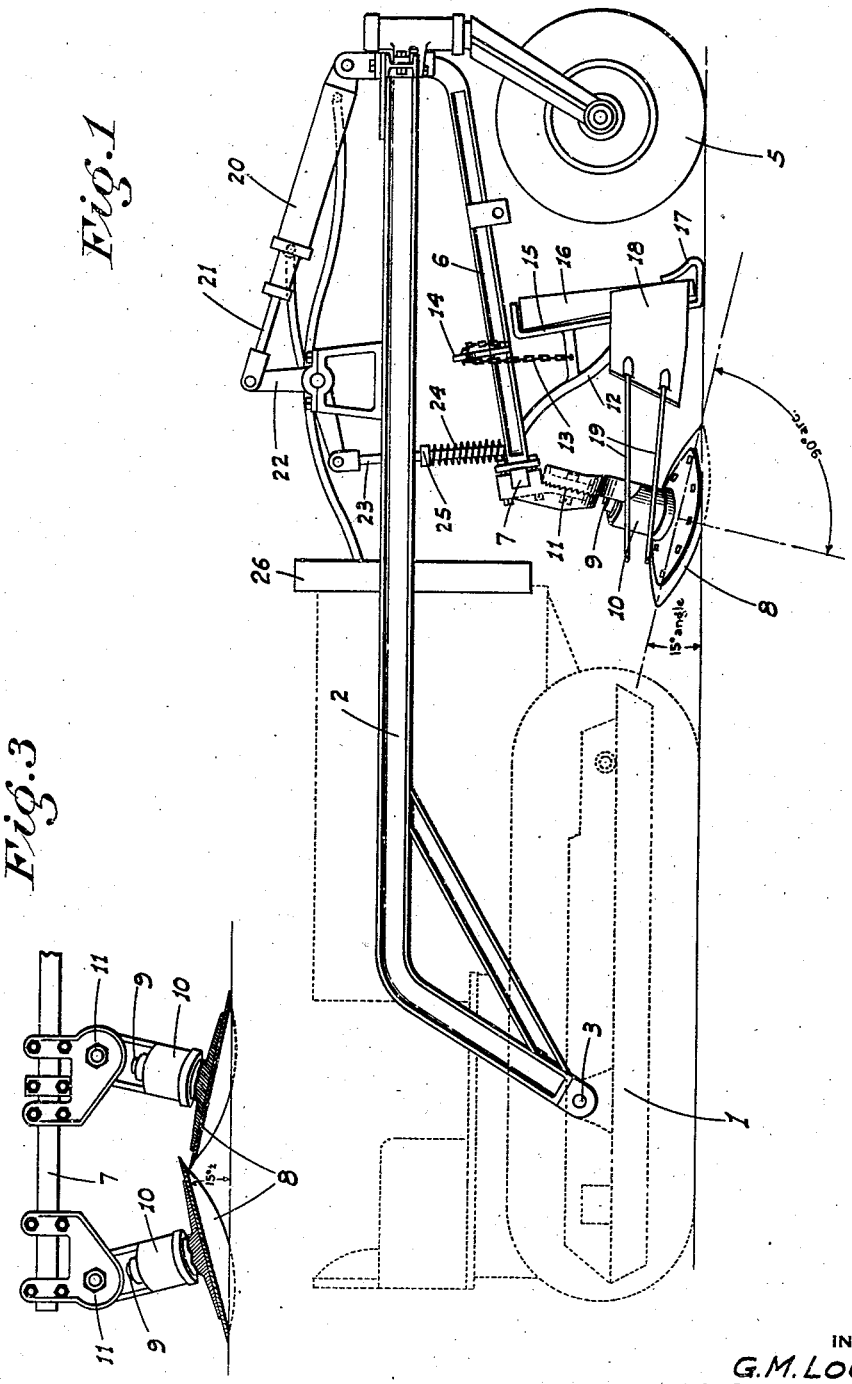
Fig. 1 is a side elevation of our improved bean cutter showing in dotted lines the tractor on which it is adapted to be mounted.

Referring now more particularly to the characters of reference on the drawings, the numeral 1 indicates in general outline a tractor or other motive carrier for the cutting implement.

The implement itself comprises a supporting frame including arms 2 pivoted at a convenient point on the tractor 1 as at 3. These arms are jointed together by suitable brace elements 4 and are supported at their outer ends by tiller wheels 5. These tiller wheels may be either broad-tired metal or rubber wheels or sharp splitter wheels, the latter of which will ride between the rows in thick growth and cut the vines apart between rows so they may be divided as the cutting discs follow to sever the vines from the roots.

Arms 6 are pivotally mounted at the forward end of the supporting frame 2—4. These arms 6 are braced together by cross braces 6a and extend backwardly, and at their free ends support a cross bar 7 adapted to support the cutting discs, dividing roller and shoe and deflecting plates.

The cutting elements are flat discs 8 provided with stub shafts 9 mounted for free turning movement in bearings 10, which are secured by adjustable clamps 11 to the cros bar 7.

The clamps 11 are so adjusted on the cross bar 7 as to cant each flat disc at such an angle that the front edge of the disc will engage the ground surface at a point substantially midway of such front edge and so that such front edge from such engaging point will move just under the earth through an arc of substantially ninety degrees, as shown in Fig. 1. The cant of the discs is at about a fifteen degree angle which is correct to provide that the beveled cutting edge of the disc alone will engage just under the surface of the earth through such ninety degree arc. Hence with the forward push of the implement, the friction of the soil against this arc will rotate the disc to cause it to sever the vines at the crown of the roots and at the same time act as an abrasive to continuously maintain a keen cutting edge on the disc.

The crown of the roots is exposed to this cutting action by means of the deflecting mechanism disposed in front of each disc. This comprises a forwardly extending arm 12 pivoted on the cross bar 7 and held in selected position by a suspension chain 13 arranged for engagement with a supporting hook 14 fixed on one of the arms 6. Supported forwardly on this arm is the vertical roller bracket 15 in which is journalled the divider roller 16 which is free to revolve in said bracket 15. The bracket 15 terminates at its lower end in a ground engaging shoe 17 which overlaps the lower end of the roller 16. Also mounted on the bracket 15 are the divider plate 18 and the deflecting finger bars 19 which extend above and over the discs 8 just back of the ground engaging arc thereof.

As the implement is pushed forwardly by the tractor, the splitter wheel 5 splits the rows of vines apart. The same then tend to pile up against the roller 16 which throws them in the path of the dividing plates 18, where the deflecting fingers 19 turn them back and windrow them as the cutting discs function to sever them from the roots.

The entire cutting mechanism may be adjusted in a vertical plane for any purpose through the medium of fluid pressure jacks 20. The piston rods 21 of these power jacks connect with bell cranks 22 from which are suspended links 23 on which are hung the frame 7 which is mounted on the links for relative vertical movement, but being normally held down by yieldable springs 24 interposed between the frame 7 and stops 25 on the links 23.

Vertical movement of the frame members 2 is guided over guide bars 26 mounted adjacent the forward end of the tractor 1.

From the foregoing description it will be apparent that we have produced a disc cutting mechanism in which the discs will easily and effectively function to sever bean vines from their roots without the necessity of the same being power driven and without any appreciable wear on the disc, and at the same time continuously and automatically maintaining sharp cutting edges on the discs. Attention is called to our Patent 2,064,480.

While we have described the implement as a whole in some detail, it will be well understood that such deviations from such detail may be resorted to as do not constitute a departure from the spirit of the invention as defined in the following claims.

What we claim as new and useful and desire to secure by Letters Patent is:

1. In a vine cutter the combination of a supporting frame, a flat disc mounted on the frame and being free to rotate, such disc being canted at such an angle to the horizon as to cause the front edge of the disc to engage and project just under the earth through an arc of substantially ninety degrees rearwardly on one side from the foremost point of said edge of the disc, whereby the friction of the earth against the disc as the frame moves forwardly will cause the disc to rotate.

2. In a vine cutter the combination of a supporting frame, a flat disc mounted on the frame and being free to rotate, such disc being canted at such an angle to the horizon as to cause the front edge of the disc to engage the ground surface at a point substantially midway of the front edge of the disc and to cause the disc to project just under the earth through an arc of substantially ninety degrees from such midpoint, whereby the friction of the earth against the disc as the frame moves forwardly will cause the disc to rotate, and means to windrow growing vines just to the side of such arc to expose the crown of the roots of the vines to the cutting edge of the disc, such windrowing means including a supporting bracket mounted ahead of the disc, divider plates on the brackets and deflecting finger bars on the plates extending over the discs just inside the ninety degree arc.

3. A supporting frame for a ground working implement adapted for attachment to a tractor comprising a pair of relatively heavy main side beams spaced apart to receive the tractor therebetween, a cross member rigidly tying the beams together at their forward end, swivel wheels supporting the frame at said end, means to pivot the beams at their rear end on the tractor in such a position that the beams for a considerable portion of their length project ahead of the tractor, diagonal braces rigidly connecting the beams along such projecting portion, auxiliary side beams supported and extending rearwardly from the main beams at their forward end under the braces, said auxiliary beams terminating ahead of the tractor and having an implement-mounting crossbar at their rear end, and diagonal braces rigidly connecting said auxiliary beams.

GEORGE M. LOCK.
ARTHUR O. RASMUSSEN.